United States Patent [19]

Corrales

[11] 4,184,742
[45] Jan. 22, 1980

[54] HERMAPHRODITIC FIBER OPTIC CONNECTOR

[75] Inventor: Patrick G. Corrales, Garden Grove, Calif.

[73] Assignee: International Telephone and Telegraph Corporation, New York, N.Y.

[21] Appl. No.: 955,178

[22] Filed: Oct. 26, 1978

[51] Int. Cl.² .................................................. G02B 5/14
[52] U.S. Cl. ............................. 350/96.21; 350/96.20
[58] Field of Search .............. 350/96.20, 96.21, 96.22

[56] References Cited

U.S. PATENT DOCUMENTS

| | | | |
|---|---|---|---|
| 4,088,390 | 5/1978 | McCartney | 350/96.21 |
| 4,094,580 | 6/1978 | Cook et al. | 350/96.21 |

FOREIGN PATENT DOCUMENTS 2516662  7/1976  Fed. Rep. of Germany ........ 350/96.21

*Primary Examiner*—Stewart J. Levy
*Attorney, Agent, or Firm*—Thomas L. Peterson

[57] ABSTRACT

A hermaphroditic optical fiber connector member is disclosed comprising a hollow yoke and a cylindrical ferrule guide member in front of the yoke. The guide member has a stepped forward end. Cylindrical fiber optic ferrules have a sliding fit in cylindrical alignment bores extending axially through the guide member. The yoke embodies radial slots through which the optical fibers extend for connection to the ferrules during assembly.

5 Claims, 5 Drawing Figures

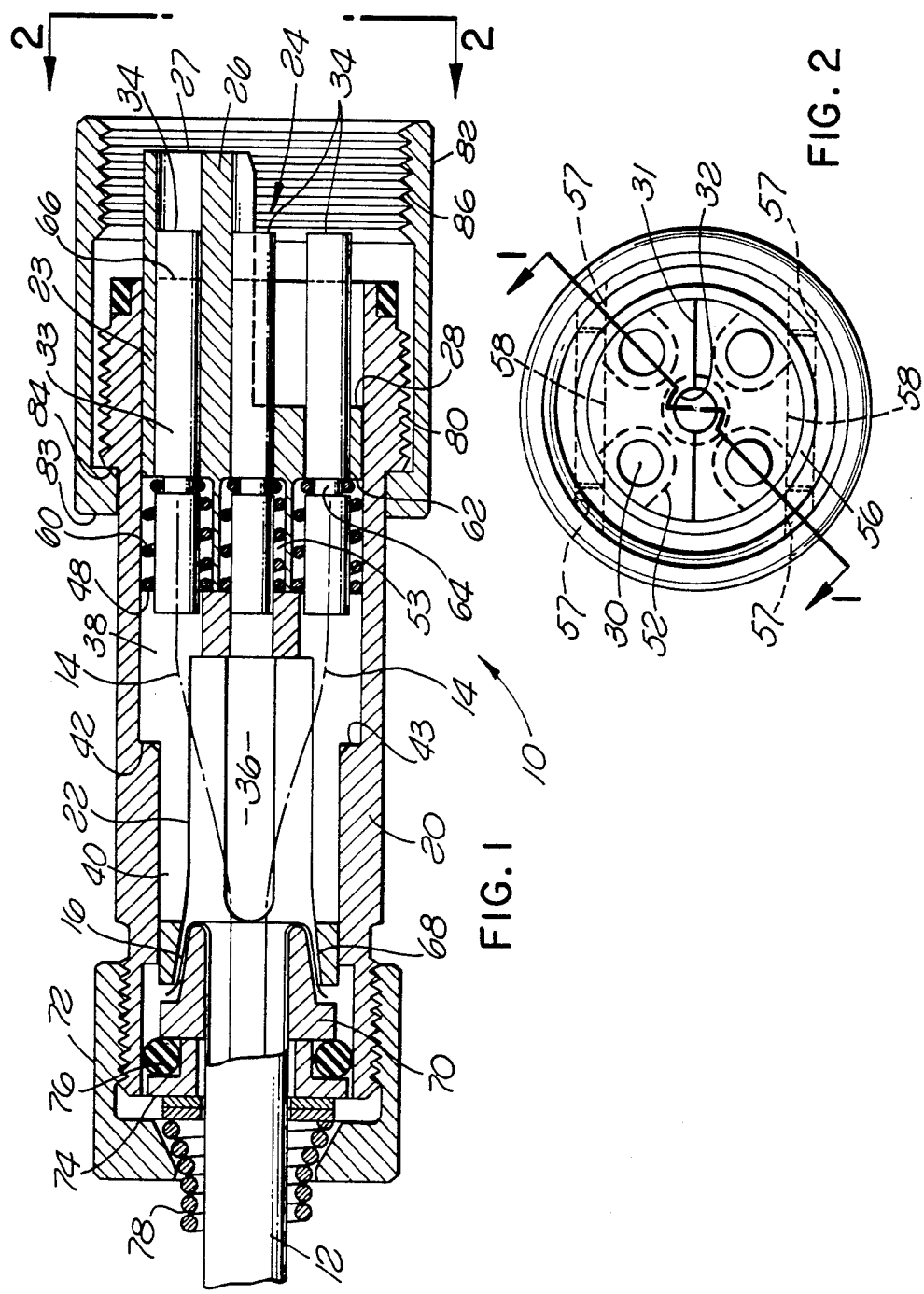

4,184,742

HERMAPHRODITIC FIBER OPTIC CONNECTOR

BACKGROUND OF THE INVENTION

The present invention relates generally to a fiber optic connector and, more specifically, to a hermaphroditic fiber optic connector for single optical fibers.

U.S. Pat. No. 4,088,390 to McCartney discloses a hermaphroditic connector for single optical fibers in which each connector member of the connector has a ferrule guide with a stepped forward end. Each ferrule of the connector member comprises a resilient metal eyelet through which the optical fiber is mounted with three cylindrical radially deflectible posts surrounding the eyelet. Each ferrule is mounted in a passage which opens to the outer periphery of the guide. When the mating halves of the connector are interengaged, a cam element on each connector member engages the rods on half the ferrules of the other connector member urging the rods radially inwardly to consolidate around the eyelets of the ferrules. An optical fiber spreader member is positioned behind the ferrule guide. This arrangement is quite complex and requires a substantial number of parts, thereby increasing its cost of manufacture and assembly.

U.S. Pat. No. 4,047,797 to Arnold et al. discloses a single fiber optic connector member employing a yoke on which ferrules are retained by means of separable caps. A two-piece restraint member is fixedly attached to the strength member of the fiber optic cable to which the connector is coupled. The restraint member is removably mounted in a transverse slot in the rear section of the yoke. The yoke consists of five parts and, thus, is relatively expensive to manufacture and assemble, and the connector member in which it is mounted is not of hermaphroditic construction.

It is the purpose of the present invention to provide a novel and simple hermpahroditic fiber optic connector member which has fewer parts, is less expensive to manufacture and assemble, and provides more precise alignment for the optical fibers in the connector than the aforementioned prior art connectors.

SUMMARY OF THE INVENTION

According to a principal aspect of the present invention, there is provided a hermaphroditic connector member for a fiber optic cable having a plurality of single optical fibers. The connector member comprises a hollow yoke having a forward end and a rear. A cylindrical ferrule guide member is located at the front of the yoke. The guide member has a stepped forward end providing a forward semi-cylindrical segment terminating in a front semi-cylindrical surface and a rear forwardly facing semi-cylindrical surface behind the front surface. A plurality of cylindrical alignment bores extend axially through the guide member. The bores are symmetrically arranged relative to the stepped forward end and the center axis of the guide member, and open at the front and rear semi-cylindrical surfaces of the guide member. A cylindrical fiber optic ferrule is slidably mounted in each of the bores. Each ferrule has a mating end face located between the front and rear semi-cylindrical surfaces. The hollow yoke has slots opening radially through the wall thereof and at its forward end in alignment with the bores in the guide member, whereby the optical fibers of the cable may be extended outside of the yoke for termination to the ferrules during assembly of the connector member.

This arrangement utilizes a minimum number of parts, thus reducing manufacturing and assembly costs, yet provides an effective alignment mechanism for the ferrules of the connector and a hermaphroditic construction.

BRIEF DESCRIPTION OF THE DRAWINGS

FIG. 1 is a partial longitudinal sectional view taken along line 1—1 of FIG. 2 showing the hermaphroditic connector member of the present invention;

FIG. 2 is a front end view of the connector member illustrated in FIG. 1;

DESCRIPTION OF THE PREFERRED EMBODIMENT

Figure 3:
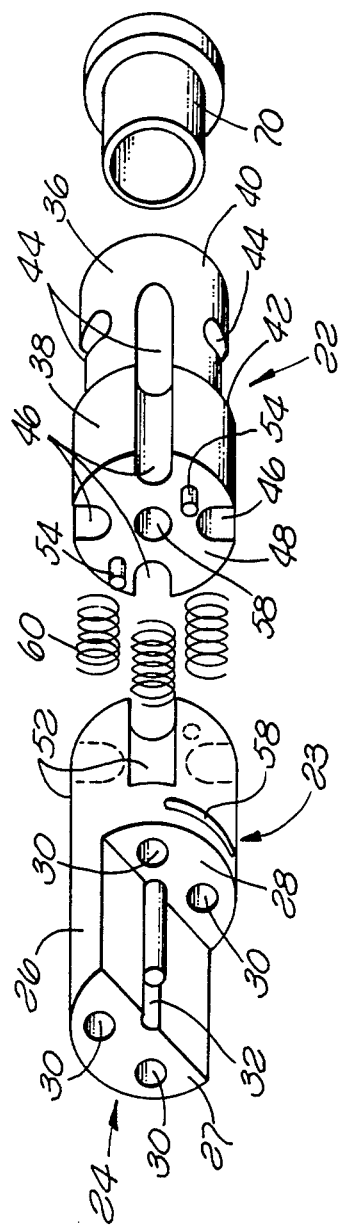
FIG. 3 is a perspective view showing the ferrule guide member, yoke and cable restraining member clamp utilized in the connector member of FIGS. 1 and 2.
Figure 5:
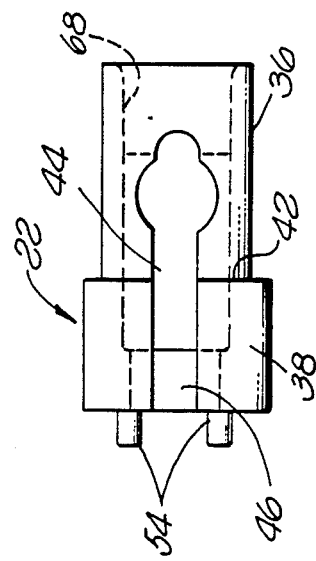
FIG. 5 is a top plan view of the yoke illustrated in FIG. 3.

Referring now to the drawings in detail, there is illustrated in FIGS. 1 and 2 the hermaphroditic fiber optic connector member of the present invention, generally designated 10. The connector member 10 is connected to a fiber optic cable 12 containing a plurality of single optical fibers 14, five being used by way of example only, and a cable strength member 16.

The connector member 10 comprises a shell 20 containing a yoke 22 and a ferrule guide 23. The guide has a stepped forward end, as indicated at 24, providing a forward semi-cylindrical segment 26 terminating in a front semi-cylindrical surface 27, and a rear forwardly facing semi-cylindrical surface 28 spaced behind the front surface 27. Five cylindrical alignment bores 30 extend axially through the guide symmetrically arranged relative to the stepped forward end and the center axis of the guide. As best seen in FIG. 2, four of the bores are offset 90° from each other and are spaced equi-distant from the inner flat surface 31 of the forward semi-cylindrical segment 26. Such surface 31 extends along the center axis of the guide from the front semi-cylindrical surface 27 to the rear surface 28. A semi-cylindrical groove 32 is formed in the flat surface 31 extending along the center axis of the guide from the front surface 27 to the rear surface 28. Thus, the groove 32 is coaxial with the center bore 30 in the guide. A cylindrical fiber optic ferrule 33 is slidably mounted in each of the bores 30, the center ferrule also being slidable in the semi-cylindrical groove 32 of the guide. The ferrules have mating end faces 34 located between the front and rear surfaces 27, 28, respectively, but slightly closer to the front surface for a reason which will be explained later herein.

The yoke 22 comprises a hollow body 36 having a forward cylindrical section 38 and a rear cylindrical section 40 of a diameter smaller than that of the forward section, defining therebetween a rearwardly facing annular shoulder 42. The shoulder 42 abuts a forwardly facing annular shoulder 43 on the inside of the shell 20.

Four longitudinally extending slots 44 extend through the wall of the hollow body 36. The slots communicate with arcuate channels 46 in the forward section 38 of the yoke. The channels 46 are spaced 90° from each other, are qui-distant from the center axis of the yoke, and open at the forward face 48 of the yoke. A center cylindrical passage 50 also opens at the face 48.

Arcuate longitudinally extending channels 52 are formed in the rear portion of the guide 23 opening at the outer periphery of the guide and coaxial with the bores 30. The location of the channels 52 in guide 23 corresponds to the position of the channels 46 in the yoke. A counterbore 53 is provided for the rear of the center bore 30, as seen in FIG. 1.

Figure 4:
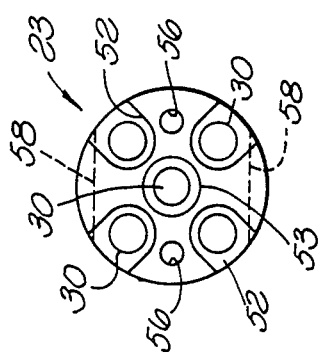
FIG. 4 is a rear view of the ferrule guide illustrated in FIG. 3.

A pair of pins 54 extend forwardly from the front face 48 of the yoke 22. The pins are slidable into holes 56 in the rear of the guide 23, as seen in FIG. 4. The cooperating pins 54 and holes 56 locate the yoke and ferrule guide so that the channels 46 in the yoke are aligned with the channels 52 in the guide 23.

Cross pins 56 mounted in the connector shell 20 pass through lateral slots 58 on the top and bottom of the guide 23 to fix the guide against rotation and axial movement in the shell, as best seen in FIG. 2.

A coil spring 60 surrounds the rear of each ferrule 33. The rear of the coil spring engages the front face 48 of the yoke while the front convolution of each spring engages a rearwardly facing shoulder 62 formed by an annular groove 64 in the ferrule. The springs 60 bias the ferrules forwardly in the bores 30 to the position illustrated in FIG. 1. When the connector member 10 of the present invention is mated with an identical hermaphroditic connector member, the ferrules in the respective members will abut and move rearwardly against the force of the springs 60 until the front forward mating surfaces 34 of the ferrules retract to the dotted line position indicated at 66 in FIG. 1.

The cylindrical rear portion 40 of the yoke 22 provides a circular opening 68 into which there is slidably fitted a clamping ring 70. The clamping ring 70 clamps between it and the surface of the opening 68, the strength member 16 of the fiber optic cable 12. A cap 72 through which the cable extends is threaded to the rear of the connector shell 20. The cap pushes a retaining ring 74 forwardly to compress an elastomeric O-ring 76 against the rear of the clamping ring 70 to seal the rear of the shell 20. A strain relief spring 78 is retained by the cap and extends outwardly therefrom around the cable 12.

To connect the connector member 10 to the fiber optic cable 12, the cap 72, spring 78, retaining ring 74, O-ring 76, clamping ring 70 and shell 20 are pushed onto the cable in that order. Then the cable jacket at the forward end of the cable is removed so that the five individual bare optical fibers 14 may be threaded into the rear of the yoke 22. Four of the fibers are then threaded through the slots 44 in the yoke while the fifth fiber is threaded through the center passage 50. The fibers are sufficiently long to extend forwardly of the yoke. The strength member 16 of the cable is then folded rearwardly over the ring 70 and is pushed into the rear of the yoke to firmly clamp the strength member of the cable thereto. Thereafter, the springs 60 and the ferrules 33 are assembled to each other and then mounted on the ends of the fibers and slid rearwardly thereon until the springs engage the front face 48 of the yoke. The fibers are then cleaved near the front faces of the ferrules and secured therein by an epoxy. The yoke and ferrule assembly is mounted in a suitable fixture (not shown) to polish the fibers flush with the front faces of the ferrules. The yoke serves to properly and firmly hold the ferrules in the fixture for accurate polishing.

The guide 23 is then mounted on the front of the yoke with the forward ends of the ferrules entering the alignment bores 30 of the guide. The shell 20, retaining ring 74, cap 72, and strain relief spring 78, which may have previously been mounted over the cable 12, are then pushed forwardly over the yoke and guide assembly until the shoulder 44 on the shell engages the shoulder 42 on the yoke. The guide is oriented rotationally in the shell so that the slots 58 are aligned with the apertures 57 in the shell so that the cross pins 56 may be inserted through the apertures and slots to fix the guide, and thus the yoke, axially and against rotation in the shell. The cap 72 is then tightened on the rear of the shell.

The forward end of the shell is externally threaded as indicated at 80. A coupling nut 82 is rotatable on the forward end of the shell. The coupling nut embodies an inwardly extending annular flange 83 which abuts a rearwardly facing shoulder 84 on the shell. The forward end of the coupling nut is internally threaded as indicated at 86. When the coupling nut is in its forward position, as illustrated in FIG. 1, its threaded forward end 82 is in position to threadedly engage the threads 80 of a mating connector member and couple the two members together. In such case, the coupling nut of the mating connector member would be threaded rearwardly over the threads 80 so that the coupling nut is behind the threads.

The yoke 22 and ferrule guide 23 may each be a one-piece molded part. The cable strength member clamp 70 is likewise a one-piece molded part which effectively clamps the strength member of the cable by axial sliding movement at the rear of the yoke. It will, therefore, be appreciated that by the present invention there is provided a very simple and inexpensive arrangement for mounting fiber optic ferrules in a hermaphroditic single fiber connector member.

What is claimed is:

1. A hermaphroditic connector member for a fiber optic cable having a plurality of single optical fibers comprising:
   a hollow yoke having a forward end and a rear;
   a cylindrical ferrule guide member at the front of said yoke having a stepped forward end providing a forward semi-cylindrical segment terminating in a front semi-cylindrical surface and a rear forwardly facing semi-cylindrical surface behind said front surface;
   a plurality of cylindrical alignment bores extending axially through said guide member symmetrically arranged relative to said stepped forward end and the center axis of said guide member, said bores opening at said front and rear surfaces, respectively;
   a cylindrical fiber optic ferrule slidably mounted in each of said bores, said ferrules having mating end faces located between said front and rear surfaces; and
   said hollow yoke having slots opening radially through the wall thereof and at said forward end in alignment with said bores whereby the optical fibers of the cable may be extended outside of said yoke for termination to said ferrules.

2. A connector member as set forth in claim 1 for a fiber optic cable having a strength member including:
   an axial opening in said rear of said yoke; and
   a clamping ring slidably mounted in said opening for clamping between said ring and the wall of said opening the strength member of a fiber optic cable extending into said ring.

3. A connector member as set forth in claim 1 including:
axially extending channels in the rear portion of said guide member opening at the periphery of said guide member and aligned with said bores for facilitating insertion of said ferrules into said bores following termination to the optical fibers.

4. A connector member as set forth in claim 1 wherein:
said stepped forward end of said guide member provides a flat surface coplanar with said center axis;
a semi-cylindrical groove is formed in said flat surface extending along said center axis from said front surface to said rear surface;
a cylindrical center bore is provided in said guide member extending rearwardly from said rear surface coaxial with said groove; and
an additional cylindrical fiber optic ferrule is slidably mounted in said center bore and groove.

5. A connector member as set forth in claim 1 wherein:
said yoke and said guide member are each a one-piece molded part.

* * * * *